UNITED STATES PATENT OFFICE.

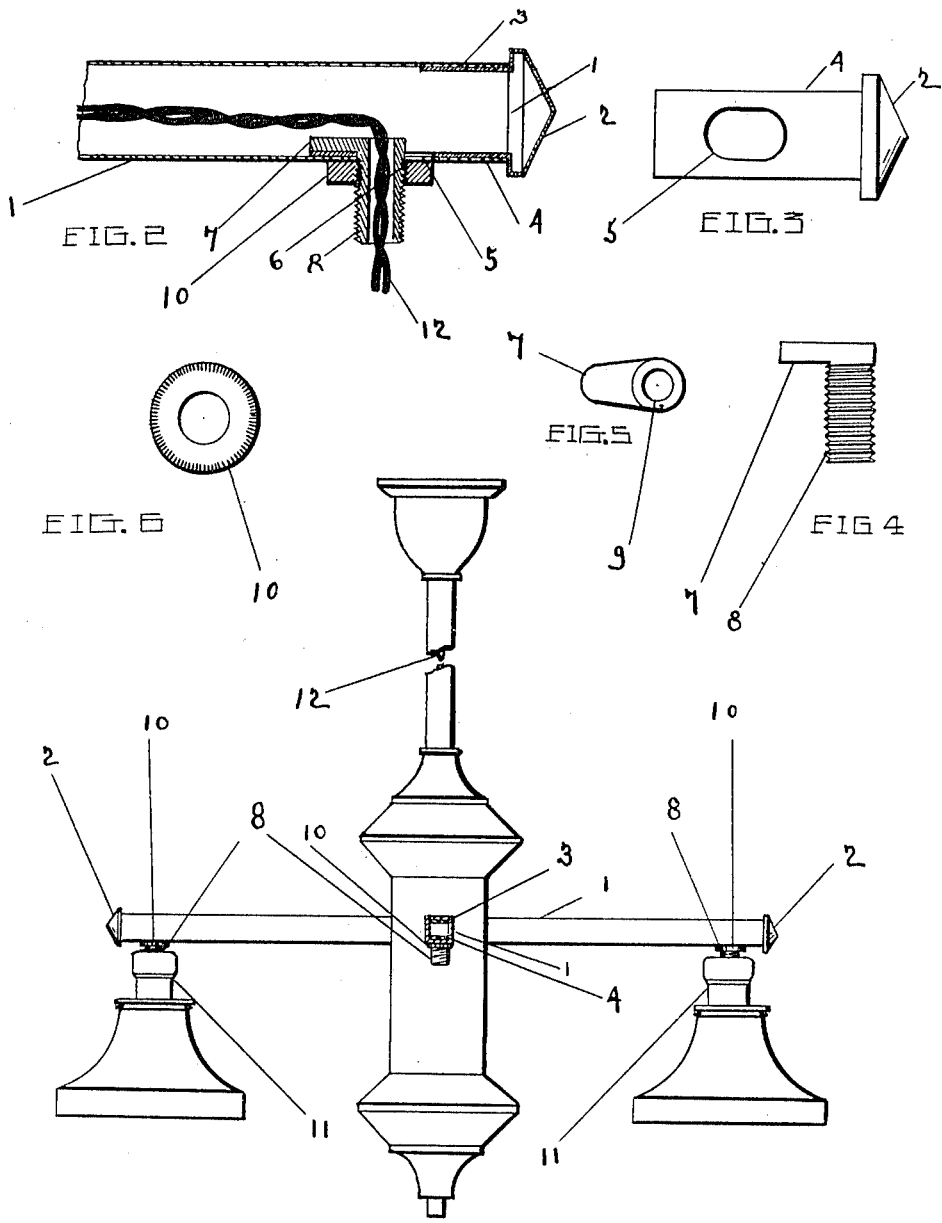

HERBERT M. McKECHNIE, OF TOLEDO, OHIO.

LIGHTING-FIXTURE.

1,071,938.　　　　　Specification of Letters Patent.　　Patented Sept. 2, 1913.

Application filed December 3, 1912. Serial No. 734,675.

*To all whom it may concern:*

Be it known that I, HERBERT M. MC-KECHNIE, a citizen of the United States, residing at Toledo, Lucas county, Ohio, have invented a new and useful Lighting-Fixture, of which the following is a specification.

This invention relates to fixtures, and especially to simple, strong and neat assembly features therefor.

This invention has utility when embodied for arm termini of electroliers.

Referring to the drawings: Figure 1 is a fragmentary view of a chandelier or electrolier embodying the invention; Fig. 2 is a medial section longitudinally of a portion of one of the arms of the chandelier of Fig. 1; Fig. 3 is a bottom plan view of the closure; Fig. 4 is a side elevation of the tubular holding bolt which coacts with the closure and arm; Fig. 5 is a bottom plan view of the bolt of Fig. 4; and Fig. 6 is a plan view of the locking nut coacting with the tubular bolt.

The chandelier is provided with hollow arms 1, shown as rectangular in cross-section. To the open outer or free ends of the arms 1 are fitted the closures 2 having the upper entering extension 3 and the lower entering extension 4. With these extensions 3, 4, connected only by the closure terminus 2, they may have slight relative movement, and accordingly may have some spring action in moving snugly into position in the arm 1. The extension 4 is shown as provided with an opening 5, a little elongated, which is movable into registering relation with the similar opening 6 in the arm 1. The configuration of these openings 5, 6, is such as to permit rocking of the head 7 of the bolt 8 therethrough from the outside so that the head 7 may be within the arm 1 to seat against the inner side of the extension 4. The bolt 8 has the central opening or duct 9 therethrough. With the bolt in position in the openings 5, 6, to hold the arm and closure assembled, the nut 10 may be run thereon to draw the bolt head 7 toward said nut and thus firmly lock the closure 2 to the arm 1, while further stiffening the arm at this point where the lamp support 11 may be screwed upon the bolt 8.

The closure as assembled on the arm 1 leaves a clean, artistic terminus for the arm, strengthens the arm at the point the load of the lamp is placed, thereby making a simple, compact structure readily installed by threading the conducting line 12 through the arm and hollow bolt before said parts are assembled. The bolt branching off from the arm forms an angle duct for the conducting line.

What is claimed and it is desired to secure by Letters Patent is:

1. A hollow fixture arm having an open end, a closure for said open end, said closure provided with an extension overlapping a portion of said arm, said closure and arm having registering openings, a bolt provided with a head and a threaded portion remote from said head, said bolt disposed in said openings with its head abutting one side of the overlapping portions, and a nut engaging the threaded portion of the bolt protruding through the openings on the opposite side of the overlapping portions from the bolt head, to firmly lock the overlapping portions in mutually reinforcing relation.

2. An open ended fixture arm, a closure therefor entering said arm, said closure and arm having registering openings, and a bolt having a head of a configuration relatively to said openings to permit insertion of said bolt head through said openings to engage the closure and protrude through the openings, and a nut on the bolt outside of the arm to lock the closure and arm in mutually reinforcing position.

In testimony whereof I affix my signature in the presence of two witnesses.

HERBERT M. McKECHNIE.

Witnesses:
　GEO. E. KIRK,
　GLADYS JAMESON.

---

Copies of this patent may be obtained for five cents each, by addressing the "Commissioner of Patents, Washington, D. C."